Sept. 19, 1961 J. KEENER 3,000,654
FIFTH WHEEL ADAPTER
Filed Sept. 29, 1959
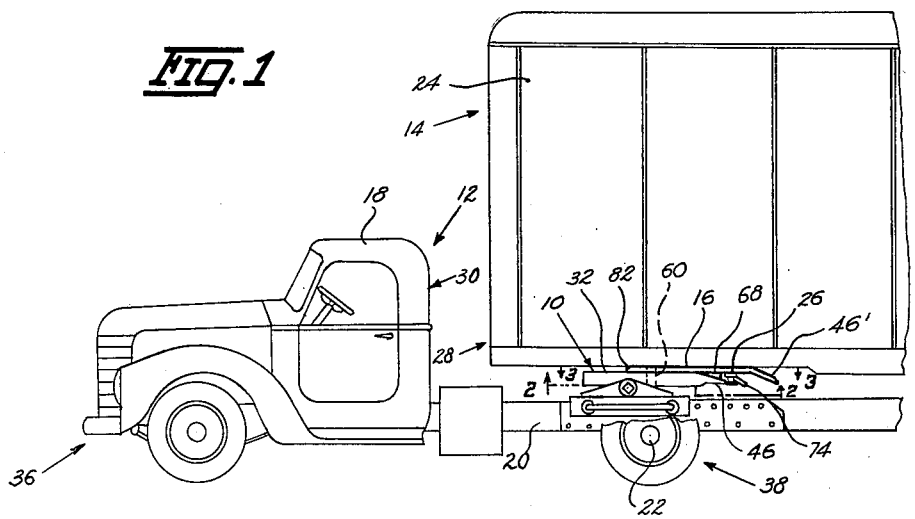
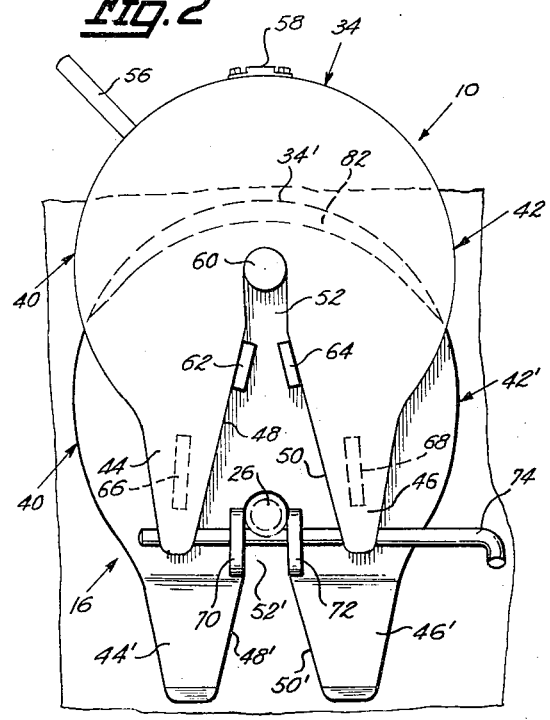
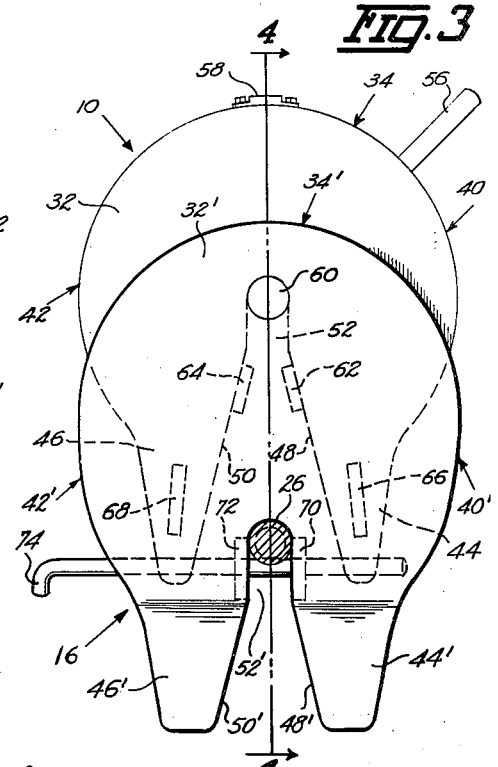
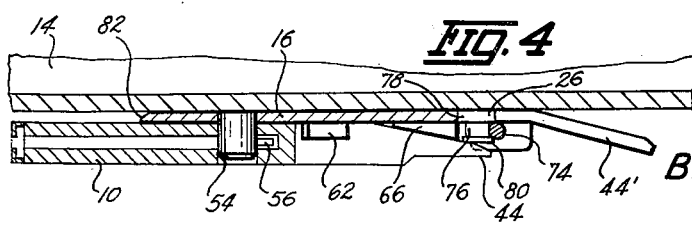
INVENTOR.
JOHN KEENER
BY Morton S. Adler
ATTORNEY.

United States Patent Office 3,000,654
Patented Sept. 19, 1961

3,000,654
FIFTH WHEEL ADAPTER
John Keener, Des Moines, Iowa, assignor of thirty-three and one-third percent to George M. Clarkson and thirty-three and one-third percent to Gibson C. Holliday, both of Des Moines, Iowa
Filed Sept. 29, 1959, Ser. No. 843,229
12 Claims. (Cl. 280—433)

This invention relates to what is known as the fifth wheel on trucks or prime movers used to pull semitrailers.

With the trend in recent years of moving an increasing amount of freight by truck, many semitrailers used for carrying the freight have been made of such sizes that in ever increasing situations the more or less standard prime movers are too short for getting the fifth wheel thereon in coupling engagement with the king pin on the trailer. More particularly in this regard the generally recognized standard king pin setting on semitrailers is thirty six inches, providing, as is obvious, a thirty six inch overhang of the forward portion of the trailer relative to the king pin. The prime movers in most common use for pulling such trailers have a wheel base on which the distance between the rear of the cab and the fifth wheel is adequate to permit coupling with the standard size trailer for pulling and turning and will also be adequate for trailers possibly up to six inches longer of king pin setting. There are, however, an increasing number of special trailers constructed with king pin settings at distances greater than standard. These are usually at six inch intervals up to fifty six inches. It will thus be apparent that on trailers having approximately forty two inch and longer king pin settings, the front of the trailer will project so far forwardly of the king pin so as to either abut the rear of the truck cab before the king pin reaches a registering position with the fifth wheel, or be so closely adjacent the rear of the cab that sufficient room for turning is not turning is not present.

There are, of course, prime movers with a long enough wheel base to handle these special trailers but by far, the greater number of such movers in use are capable only of handling the standard trailer indicated above. Consequently in situations around loading docks and for moving semitrailers on and off piggyback railroad cars where one prime mover is utilized to jockey or maneuver several different trailers, much as a switch engine is used in a railroad yard, a special length trailer cannot be moved unless a truck adequate to handle it is present or is obtained. Such trucks are extremely expensive to be maintained as standby equipment and are generally not kept as ordinary docking facilities. As a result, the docking, loading or unloading of special trailers is delayed when special trucks must be obtained, and this of course adds considerably to costs involved.

The economical advantage of being able to efficiently use a prime mover with any sized trailer for short moves around loading docks and for moving such trailers on and off railroad flat cars is obvious, and therefore the principal object contemplated by this invention is the provision of a fifth wheel adapter designed to permit a prime mover to be coupled with a king pin on a trailer to which it would not normally be able to be coupled because of the long forward overhang of the trailer body relative to its king pin.

A further object herein is to provide a fifth wheel adapter as indicated which can be easily and quickly attached to or removed from the fifth wheel on a prime mover and has means for becoming interlocked with such fifth wheel so as to form a rigid connection therewith.

Further objects and the more obvious advantages of the invention will be mentioned or else appear plainly from the description which follows.

This invention consists of novel parts and combination of parts to be hereinafter described whereby the objects set forth are attained, as pointed out in the claims, and illustrated in the accompanying drawings, in which:

FIG. 1 is a side elevational view of a truck or prime mover showing the forward portion of a semitrailer coupled to the fifth wheel thereon by means of this invention, FIG. 2 is an enlarged bottom plan view of this adapter attached to the fifth wheel taken from the line 2—2 of FIG. 1, FIG. 3 is a top plan view similar to FIG. 3, but taken from the line 3—3 of FIG. 1, and FIG. 4 is a sectional view taken on the line 4—4 of FIG. 3.

Referring to the drawings this invention is designed for use with the fifth wheel 10 on a truck or prime mover 12 for pulling a semitrailer 14 and while no invention is claimed for members 10, 12 and 14, certain parts thereof will be more particularly referred to and numbered to facilitate the orientation of my fifth wheel extension adapter 16 thereto.

Truck 12 will include the relatively short cab 18 with the fifth wheel 10 suitable mounted on the rearward portion of the chassis or frame 20 over the rear axle 22. Trailer 14 includes the body 24 having a depending king pin 26 disposed at a predetermined distance or setting relative to the forward end 28 of trailer body 24. Such king pin settings on generally recognized standard trailers are thirty-six inches, and trucks 12 of the type in common use have a wheel base designed to adequately accommodate such trailers by providing ample room between the forward end 28 of body 24 and the rear side 30 of cab 18 to permit coupling of the king pin 26 with the fifth wheel 10 for pulling and turning. On trailers 14, however, of a size where the king pin setting is materially greater than on standard trailers, and the number of such trailers is increasing steadily, the standard truck 12 does not provide sufficient distance between the rear 30 of cab 18 and the fifth wheel 10, to permit such trucks to couple with and move these larger trailers. I have overcome this problem by my adapter 16 which increases the distance between the point of coupling engagement of the king pin 26 to the fifth wheel 10 and the rear side 30 of the cab 18.

The fifth wheel 10 which is securely mounted to the frame 20 is a metal plate presenting a horizontal top surface referred to as the top plate 32. Wheels 10 may vary slightly in shape according to their source of manufacture but in general they will present a curved forward edge 34 relative to the respective forward and rearward ends 36 and 38 of the truck 12 and may define a uniform radius at the sides 40 and 42 as shown or be otherwise shaped such as straight which for purposes of this invention are immaterial. Sides 40 and 42 of wheel 10 terminate in the respective rearwardly projecting guide arms 44 and 46 which are spaced apart and have opposed edges 48 and 50 converging from their outer end to terminate in an axially disposed coupling socket 52 in plate 10. Arms 44 and 46 are also inclined downwardly relative to the plane of the top plate 32. As indicated above, no invention is claimed in the fifth wheel 10 per se as described and it will be understood that suitable coupling means indicated generally at 54 is associated with socket 52 for holding a king pin, and may include certain locking controls designated by the numerals 56 and 58 which operate in a well known manner.

Referring now to my adapter or coupling plate member 16, it is substantially the same in general construction and appearance as the fifth wheel 10 and will be oriented in the same way relative to the forward 36 and rear 38 end of the truck 12. In this respect, parts of the adapter 16 which corerspond to like parts on the wheel 10 are given like numerals primed. A king pin 60 is secured in depending relationship to adapter 16 forwardly of socket 52' so as to be spaced a relatively short distance inwardly from the forward end 34' as illustrated more clearly in FIGS. 2 and 3. Pin 60 is designed to be placed in coupling engagement with socket 52 of wheel 10 the same as king pin 26 would be without the use of my adapter 16. In this position, adapter 16 will be upon wheel 10 and guide arms 44' and 46' will project rearwardly from arms 44 and 46 for a distance equal to the distance between socket 52' and king pin 60. While this distance may be varied, I have preferably made it at twenty inches which will accommodate trailers with a king set pin setting of fifty-six inches and possibly a few inches longer.

To fix the adapter 16 immovable relative to wheel 10, I secured a pair of preferably elongated bar-like lugs 62 and 64 in depending relationship to adapter 16 at a point intermediate king pin 60 and socket 52'. Such lugs are designed to rest in abutting wedge-like contact with the respective edges 48 and 50 of wheel 10 at a point closely adjacent socket 52 and for this purpose, lugs 62 and 64 are angularly disposed to each other so as to be parallel with the respective converging edges 48 and 50 as shown. A second set of spaced tapered lugs or wedge members 66 and 68 depend from adapter 16 so as to rest upon the downwardly inclined guide arms 44 and 46 of wheel 10 (FIG. 4) to maintain adapter 16 on a horizontal plane. By this arrangement thus far described, it will be appreciated that adapter 16 is interlocked with wheel 10 so as to be immovable relative thereto and is suitably supported so that top plate 32' is on the same plane for coupling as top plate 32 would be alone and the effect of the adapter 16 so arranged is to present a fifth wheel assembly having a coupling socket 52' substantially rearwardly of the standard socket 52 whereby truck 12 can be hitched to trailers 14 having a king pin setting longer than normal.

King pin 26 on trailer 14 is thus placed in coupling engagement with socket 52' on adapter 16 and to secure the king pin therein for the relative short and temporary uses for which this adapter is designed, I provide a pair of depended spaced apertured ears 70 and 72 on respective opposite sides of socket 52' through which a removable locking bar 74 can be inserted to the rear of king pin 26 when the same is in place. As shown in FIG. 4, king pin 26, which is of standard construction, is generally spool shaped and includes a stem or shank 76 intermediate spaced concentrically enlarged shoulders 78 and 80, and ears 70 and 72 are so positioned that the locking bar 74 will abut shank 76 intermediate shoulders 78 and 80 as shown.

I would like to also point out that the upper edge of the forward arcuate end 34' of this adapter 16 is preferably rounded or beveled as shown at 82 and while this is not necessarily essential, it is desirable in facilitating the uncoupling of the trailer 14 from the adapter 16. Experience has shown that in the normal operation of pulling semitrailers and the turning of the truck and trailer relative to each, the outer upper edge of the fifth wheel tends to wear a groove or recess (not shown) in the bottom plate portion of the trailer which rests over the fifth wheel. Thus by beveling or rounding edge 34' of the adapter 16, it will more easily move past and over such groove in uncoupling than if it were a square cornered edge.

Actual use of the adapter 16 has demonstrated quite satisfactorily that it is extremely efficient in performing the results for which it was designed. The adapter 16, as described, forms a unitary fifth wheel assembly with wheel 10 and the king pin 26 operates in socket 52' the same as it would in socket 52 alone.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A fifth wheel extension adapter for use with the fifth wheel on a trailer pulling prime mover, said adapter comprising a coupling plate member having projecting spaced guide arms which converge from their outer end to terminate in a coupling socket in said coupling plate member, a king pin depending from said coupling plate member near the opposite end thereof relative to said guide arms and spaced from said coupling socket, said king pin adapted for coupling engagement with the fifth wheel on the prime mover, means on said coupling plate member designed to engage the fifth wheel on the prime mover for holding said coupling plate member immovable relative to the fifth wheel, said coupling socket adapted to receive a king pin on a trailer to be pulled by the prime mover, and means on said coupling plate member to secure the king pin of a trailer in operable position within said coupling socket.

2. A fifth wheel extension adapter for use with the fifth wheel on a trailer pulling prime mover, said adapter comprising a coupling plate member having a forward and rearward end respectively relative to the direction of movement of the prime mover, said coupling plate member including spaced guide arms projecting from the rearward end thereof and which converge from their outer ends to terminate intermediate the forward and rearward end of said coupling plate member in a coupling socket, a king pin depending from said coupling plate member intermediate the forward end thereof and said coupling socket, said king pin adapted for coupling engagement with the fifth wheel on the prime mover, means on said coupling plate member designed to engage the fifth wheel on the prime mover for holding said coupling plate member immovable relative to the fifth wheel, said coupling socket adapted to receive a king pin on a trailer to be pulled by the prime mover, and means on said coupling plate member to secure the king pin of a trailer in operable position within said coupling socket.

3. A fifth wheel extension adapter for use with the fifth wheel on a trailer pulling prime mover, said adapter comprising a coupling plate member having a forward and rearward end respectively relative to the direction of movement of the prime mover, said coupling plate member including spaced guide arms projecting from the rearward end thereof and which converge from their outer ends to terminate intermediate the forward and rearward end of said coupling plate member in a coupling socket, said coupling socket being closed at its forward end relative to the forward end of said coupling plate member and open at the rearward end thereof, a king pin depending from said coupling plate member intermediate the forward end thereof and said coupling socket, said king pin adapted for coupling engagement with the fifth wheel on the prime mover, means on said coupling plate member designed to engage the fifth wheel on the prime mover for holding said coupling plate member immovable relative to the fifth wheel, said coupling socket adapted to receive a king pin on a trailer to be pulled by the prime mover, and means on said coupling plate member to secure the king pin of a trailer in operable position within said coupling socket; said last mentioned means including spaced apertured ears at respective opposite sides of the rearward end of said coupling socket, and a locking bar removably mounted through said ears so as to serve as a closure for said coupling socket.

4. A fifth wheel adapter as defined in claim 3 wherein the forward end of said coupling plate member is beveled or rounded.

5. A fifth wheel adapter for use with fifth wheel on a trailer pulling prime mover, said fifth wheel being of a recognized configuration and construction defining a horizontally disposed coupling plate member with a forward and rearward end relative to the direction of travel of the prime mover and having an axially disposed coupling socket from which guide arms diverge to the rear, and with the outer portions of said guide arms inclined on a downward plane, said adapter comprising a second coupling plate member defining like members as those of the fifth wheel above enumerated, a king pin depending from the forward end portion of said second coupling plate member and in coupling engagement with the coupling socket on said fifth wheel, spaced lugs depending from said second coupling plate member in abutting engagement with said respective guide arms on said fifth wheel to hold second coupling plate member immovable relative to said fifth wheel, spaced wedge members depending from said second coupling plate member adapted to rest on the inclined portions of said respective guide arms on said fifth wheel to maintain said second coupling plate member on the same horizontal plane as said fifth wheel, the coupling socket on said second coupling plate member being spaced rearwardly of the coupling socket on the fifth wheel and adapted to receive the king pin of a trailer to be pulled, and means on said second coupling plate member to secure the king pin of a trailer in operable position within said coupling socket.

6. A fifth wheel adapter for use with the fifth wheel on a trailer pulling prime mover, said fifth wheel including a coupling socket for coupling engagement with a king pin on a trailer or the like, said adapter comprising a coupling plate member having a depending king pin and a coupling socket spaced therefrom, said coupling socket adapted for coupling engagement with a king pin on a trailer, the king pin on said coupling plate member adapted for coupling engagement with the coupling socket on the fifth wheel so that the coupling socket on the coupling plate member is spaced rearwardly from the coupling socket on the fifth wheel relative to the direction of travel of the prime mover, means on said coupling plate member susceptible of interlocking with the fifth wheel to form a unitary fifth wheel assembly in which the fifth wheel and coupling plate member are immovable relative to each other, and king pin locking means associated with the coupling socket on said coupling plate member.

7. A fifth wheel adapter for use with the fifth wheel on a trailer pulling prime mover, said fifth wheel including a coupling socket for coupling engagement with a king pin on a trailer or the like, said adapter comprising a coupling plate member having a depending king pin and a coupling socket spaced therefrom, said coupling socket adapted for coupling engagement with a king pin on a trailer, the king pin on said coupling plate member adapted for coupling engagement with the coupling socket on the fifth wheel so that the coupling socket on the coupling plate member is spaced rearwardly from the coupling socket on the fifth wheel relative to the direction of travel of the prime mover, means on said coupling plate member engageable with the fifth wheel to form a unitary fifth wheel assembly in which the fifth wheel and coupling plate member are immovable relative to each other, and king pin locking means associated with the coupling socket on said coupling plate member.

8. A fifth wheel extension adapter for use with the fifth wheel on a trailer pulling prime mover, said adapter comprising a coupling plate member having projecting spaced guide arms which converge from their outer end to terminate in a coupling socket in said coupling plate member, a king pin depending from said coupling plate member in spaced relationship relative to said guide arms, said king pin adapted for coupling engagement with the fifth wheel on the prime mover whereby said coupling socket is spaced rearwardly of the point of engagement of said king pin on the fifth wheel relative to the direction of travel of the prime mover, means on said coupling plate member designed to engage the fifth wheel on the prime mover for holding said coupling plate member immovable relative to the fifth wheel, said coupling socket adapted to receive a king pin on a trailer to be pulled by the prime mover, and king pin locking means associated with said coupling socket.

9. A fifth wheel adapter for use with the fifth wheel on a trailer pulling prime mover, comprising a coupling plate member adapted for coupling engagement with said fifth wheel, said adapter having a king pin coupling means spaced rearwardly of the point of coupling attachment afforded by the fifth wheel relative to the direction of travel of the prime mover, means on said coupling plate member engageable with said fifth wheel to hold said coupling plate member immovable relative thereto, and king pin locking means associated with said coupling plate member.

10. A fifth wheel adapter for use with the fifth wheel on a trailer pulling prime mover, said adapter comprising a fifth wheel member substantially of like construction as the fifth wheel on said prime mover and adapted for coupling engagement therewith, means on said fifth wheel member rendering it immovable relative to said fifth wheel, and king pin locking means on said fifth wheel member spaced rearwardly from the point of coupling engagement of said fifth wheel and fifth wheel member relative to the direction of travel of said prime mover.

11. A fifth wheel adapter for use with the fifth wheel on a trailer pulling prime mover, said adapter comprising a fifth wheel member substantially of like construction as the fifth wheel on said prime mover, said fifth wheel member having a forward and rear end and including a top planar surface terminating at the rear in downwardly inclined diverging guide arms, means at the forward end of said fifth wheel member for coupling engagement with said fifth wheel, king pin coupling means at the rear of said top planar surface, and means on said fifth wheel member rendering it immovable relative to said fifth wheel.

12. A fifth wheel adapter for use with the fifth wheel on a trailer pulling prime mover, said adapter comprising a fifth wheel member having spaced coupling means of which one is for coupling engagement with the fifth wheel on the prime mover and the other being adapted for coupling engagement with the king pin on a trailer, and means on said fifth wheel member rendering it immovable relative to the fifth wheel on the prime mover.

References Cited in the file of this patent
UNITED STATES PATENTS

| | | |
|---|---|---|
| 2,714,017 | Mendez | July 26, 1955 |
| 2,925,285 | Haas | Feb. 16, 1960 |

FOREIGN PATENTS

| | | |
|---|---|---|
| 168,659 | Germany | Mar. 15, 1906 |